Oct. 17, 1939.  H. MOUEIX  2,176,469
STEERING DEVICE RESPONSIVE TO RADIO SIGNALS
Filed Jan. 16, 1937
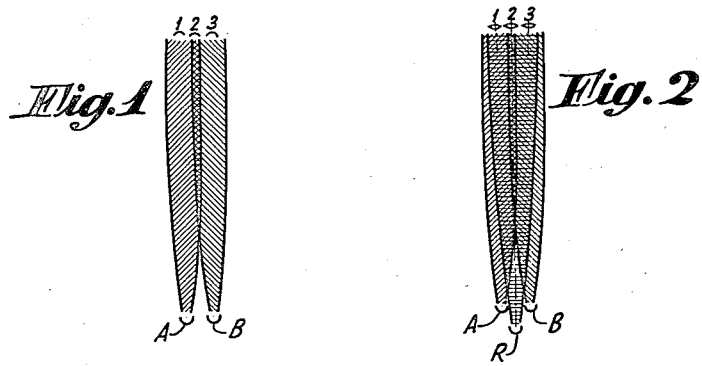
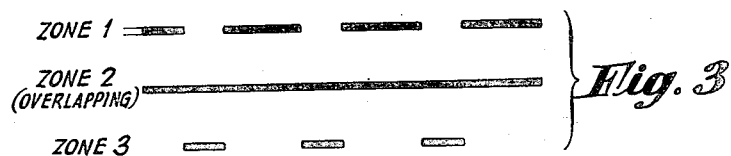
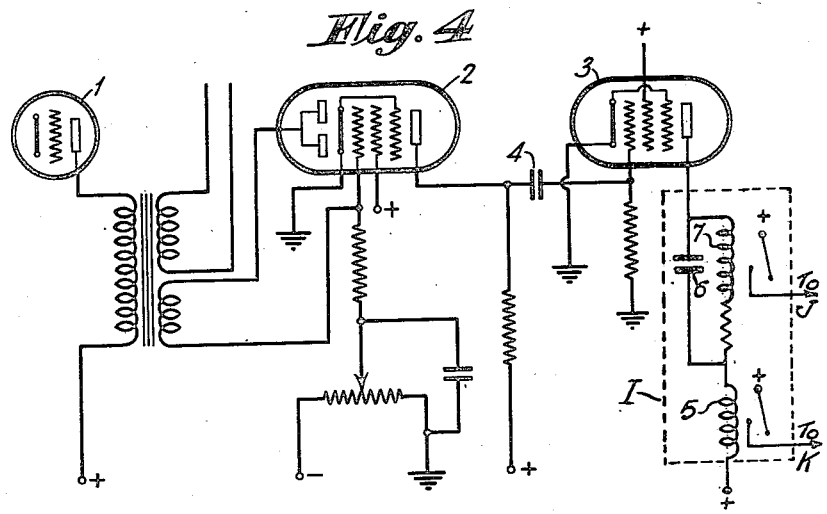
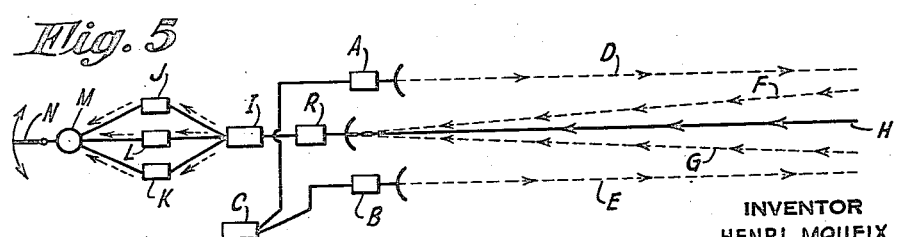
INVENTOR
HENRI MOUEIX
BY
ATTORNEY Patented Oct. 17, 1939

2,176,469

UNITED STATES PATENT OFFICE 2,176,469

STEERING DEVICE RESPONSIVE TO RADIO SIGNALS

Henri Moueix, Paris, France, assignor to Compagnie Generale de Telegraphie sans Fil, a corporation of France Application January 16, 1937, Serial No. 120,859
In France January 23, 1936

3 Claims. (Cl. 250—2)

The object of the invention is to provide a means for directing automatically a vehicle or projectile to a fixed or moving point of destination, even where this point is invisible owing to clouds, mist, or smoke.

The principle of the invention is based upon the property of ultra-short waves or light rays to be reflected by a given object and to permit the reception following reflection under favorable conditions (see French Patent 733,795 of July 20, 1934).

The invention will now be further described by reference to the accompanying drawing in which—

Figure 1 shows the directional characteristics of a system of beam antennas used in carrying out the invention, Fig. 2 shows how the radiated energy may be reflected from a remote object and received at a point near the transmitters, Fig. 3 shows diagrammatically the characteristics of the signals to be employed.

Fig. 4 shows a useful circuit arrangement of the receiving apparatus, and

Fig. 5 illustrates how my invention may be used for steering a vessel or for analogous control purposes.

With two closely disposed and highly directive transmitters A and B situated on the vehicle or projectile, two beams of ultra-short waves (Fig. 1) are sent out. These beams are preferably modulated by an audible frequency which is the same for both transmitters, and each transmitter is automatically manipulated, whereby the two manipulations are complementary so as to produce, for instance, dashes and dots.

The transmitter A, for instance, will send out dashes; the transmitter B will send out complementary dots.

Three zones are created in the beam of the emitted waves, namely:

1. The zone 1 occupied by the single transmission of A, or properly characterized by the very considerable predominance of the transmission of A. In this zone a reception of dashes will be obtained after detection.

2. The zone 3 occupied by the single transmission of B or properly characterized by the very considerable predominance of the transmission of B. In this zone a reception of dots will be obtained.

3. The zone 2 occupied by the transmission of both transmitters. At the point of reception a continuous note is given which indicates the line of equal field intensity between the beams of the two transmitters.

In carrying out the invention it is desirable to utilize one receiver R which may be carried on a vehicle or projectile in proximity to the two transmitters A and B, but so disposed as not to be directly influenced by the focussed beams lying in the zones 1 and 3. If, then, these beams are aimed in a general direction toward a wave reflecting object then any one of the three following conditions will be obtained in accordance with the position of this object (Fig. 2).

1. When the object is situated in the zone 1, the reception will be furnished by the reflection of the single transmission of A.

2. When the object is situated in the zone 3, the reception will be furnished by the reflection of the single transmission of B.

3. When the object is situated in the zone 2, the reception will be furnished by the reflection of the transmission of both transmitters A and B.

The low frequency current of the reception will have the shape indicated in Fig. 3, i. e., a succession of dashes (zone 1) in the above case 1, and a succession of dots (zone 3) in the above case 2, and a continuous intensity (zone 2) in the above case 3.

Hence, following reflection, receptions will be had that are similar to the direct receptions.

In this way it is thus possible to locate the position of the object with respect to the vehicle or projectile.

At reception, the dashes, dots or continuous notes are separated, whereby these various elements serve for actuating relays and electric controls so as to furnish the following result:

(a) Reception of dashes: Action of a first relay J.

(b) Reception of dots: Action of a second relay K.

(c) Reception of a continuous note: Blocking of the effects of the two relays.

These relays actuate the control means of a rudder or rudders by which the vehicle or projectile is given direction.

These relays and control means are so conceived as to bring the axis of movement of the vehicle into the direction upon the obstacle.

The arrangement and functioning of the respective devices could for instance be as follows in accordance with Fig. 4. At reception the signals composed of dashes and dots with any modulation frequency, preferably a low-frequency to facilitate the control measures at the place of departure, are amplified and transmitted to the last amplifier tube 1. They are thereafter detected in the tube 2, represented as a diode pentode, and amplified by the tubes 2 and 3. A high capacitance 4 couples the output circuit of tube 2 to the control grid of tube 3, this last tube being thus controlled in accordance with the rhythm of the dots and dashes. A favorable rhythm will be obtained, for instance, by choosing dots of one-half second and dashes of two seconds. The time constant of the coupling circuit could also be of the order of a second.

The output circuit of the tube 3 includes a slow acting and slow release relay 7 in circuit with a quick acting and quick release relay 5. The time constant of the relay 7 may be of the order of two seconds, if desired. A capacitor 5 may also be placed in shunt with the relay 7 for obtaining this time constant as well as for speeding up the action of the relay 5.

The relay 5 which is responsive to signals of dot frequency operates its contacts to supply current to a control device K as shown in Fig. 5. This control device K serves to energize the motor M for rotating it in one direction in order to control a rudder N. Similarly the slow acting relay 7 which is responsive to impulses of dash frequency has contacts which control the supply of current to the device J for operating the motor in a reverse direction thereby to move the rudder N opposingly to the direction first mentioned.

Upon reception of both dot and dash signals as when the receiver is in the overlapping zone 2 the responsive device under control of the tube 3 is enabled to actuate a disabling element L as shown in Fig. 5. This element L may be of any suitable type such as a relay operable only after a period greater than the commencement times between two successive dash signals. Such a device is well known in the art and its capability for disabling the circuits to the control elements J and K is well understood. For systems of this character reference is made to the following patents showing dot and dash selective relays and means for disabling the effects of such relays under conditions of reception of a continuous tone signal:

United States Patent 1,719,535 granted July 2, 1929, to W. J. Davis; United States Patent 1,655,689 granted January 10, 1928, to L. L. E. Chauveau; United States Patent 1,695,840 granted December 18, 1928, to L. L. Chauveau; United States Patent 2,131,164 granted September 27, 1928, to L. L. E. Chauveau, and United States Patent 1,835,929 granted December 8, 1931, to R. W. Bumstead.

It will thus be seen that the dot and dash selective relays 5 and 7 together with the disabling unit L are enabled to cooperate for steering a vehicle or projectile either to the left or right or to hold the rudder in a neutral position according to the reception of a dot signal, a dash signal or a continuous tone frequency.

Any other control system at reception can be used aside from that described herein by way of example only, and without intention to limitation.

It should be understood that the precise circuit arrangement which may be adopted for controlling the elements J, K and L as shown in Fig. 5 in response to the selective actuation of the relays 5 and 7 as included in the unit I (Figs. 4 and 5) is subject to the choice of those skilled in the art in designing apparatus of the type to which this invention pertains. Relay systems for accomplishing left and right steering operations in response to distinguishing signals are well known and they are not herein claimed as a novel feature of the invention. The showing here made is, therefore, schematic and is merely for the purpose of illustrating how the receiving means R may be utilized to steer a vehicle or projectile automatically in response to the reception of reflected radiant energy such as may be sent out by the transmitters A and B, these transmitters having modulating means or carrier wave interrupting means for differentiating between their signals.

The invention is particularly applicable to the equipment of a self directive scouting means. For this application the following arrangements could be used. They are mentioned by way of example only, and without intending to limit the invention thereto.

A motor operated scouting means is equipped with two transmitters and ultra-short wave receiver (16 cm. for instance).

The two transmitters furnish two highly directed ultra-short wave beams, whose common portion is situated in the axis of movement of the scouting means. These two transmitters modulated by an audible frequency of, for instance, 800 cycles are keyed automatically in dots and complementary dashes.

The receiver, whose reception beam is wider, is so situated that it does not receive the direct transmission of the two transmitters.

The directional beams are preferably obtained with projectors having a parabolic shape.

The device which detects the low frequency of the reception actuates relays and electric control means operating the rudder of the scouting means as above explained.

If the obstacle is situated in the common zone of the two transmitters, the relays are blocked and the rudder is directly straight ahead.

If the obstacle is situated in one of the preponderant zones of transmitter A or B, the audiofrequency detector of the dots and dashes operates and actuates across one of the relays and mechanical control means. The rudder of the scouting device is thereby adjusted so as to steer the scouting device directly toward its objective.

The principle and functioning are schematically indicated in Fig. 5, in which A and B represent the respective transmitters for dash and dot, which are fed by the source of modulation and keying C. The paths of the transmitted waves are shown in D and E, and those of the returning waves after reflection on the obstacle, in F, G and H. The receiver is shown in R, the low frequency detector at I; J and K are the respective dash and dot relays, L is the blocking device of the relays, M is the motor for operating the rudder N.

If, at the start, bearing is taken of the objective to be reached, and the axis of movement of the scouting means is directed upon the objective by way of listening, it can be easily seen that when the point of destination moves and is animated by a certain speed, the scouting means will move automatically in the direction upon the point of destination and arrives thereat if the speed of the scouting means is higher than that of the objective to be reached.

I claim:

1. Self-steering apparatus for a vehicle or projectile comprising means for projecting two sharply focused and partially overlapping beams of radiant energy in a generally forward direction with respect to the direction of motion of said vehicle or projectile, means for differently characterizing said beams, a receiver having an antenna connected to its input circuit, said antenna being adapted to collect a portion of said radiant energy which is reflected by an object in the zone of said beams, an output circuit for said receiver comprising two selective relays, each of said relays being operable in response to the reception of energy which is predominantly characterized according to one and the other of said beams respectively, and a rudder having reversibly operable control means under control of said relays for steering said vehicle or projectile in the direction of said reflecting object.

2. Apparatus in accordance with claim 1 and having means embodied in said receiver for demodulating signals by which said radiant energy beams may be characterized, said means being in circuit between said antenna and said relays.

3. In a self-steering system, the method of causing a moving craft to be continuously directed toward an object having radiant energy reflective properties, which comprises transmitting from said craft two differently characterized, sharply focussed and partially overlapping beams of ultra-high frequency energy in a generally forward direction with respect to the direction of motion of said craft, receiving a portion of said energy on board said craft after it has been reflected by an object in the path of either or both of said beams, and causing said craft to be steered under control of the energy of one of said beams which is predominantly received.

HENRI MOUEIX.